T. J. LEVEY.
BOTTLE CAPPING MACHINE.
APPLICATION FILED JAN. 30, 1917.

1,282,247. Patented Oct. 22, 1918.
7 SHEETS—SHEET 1.

T. J. LEVEY.
BOTTLE CAPPING MACHINE.
APPLICATION FILED JAN. 30, 1917.

1,282,247.

Patented Oct. 22, 1918.
7 SHEETS—SHEET 2.

Witness
Harold Straus

Inventor
Thos. J. Levey, by
J. A. Witherspoon
Attorney

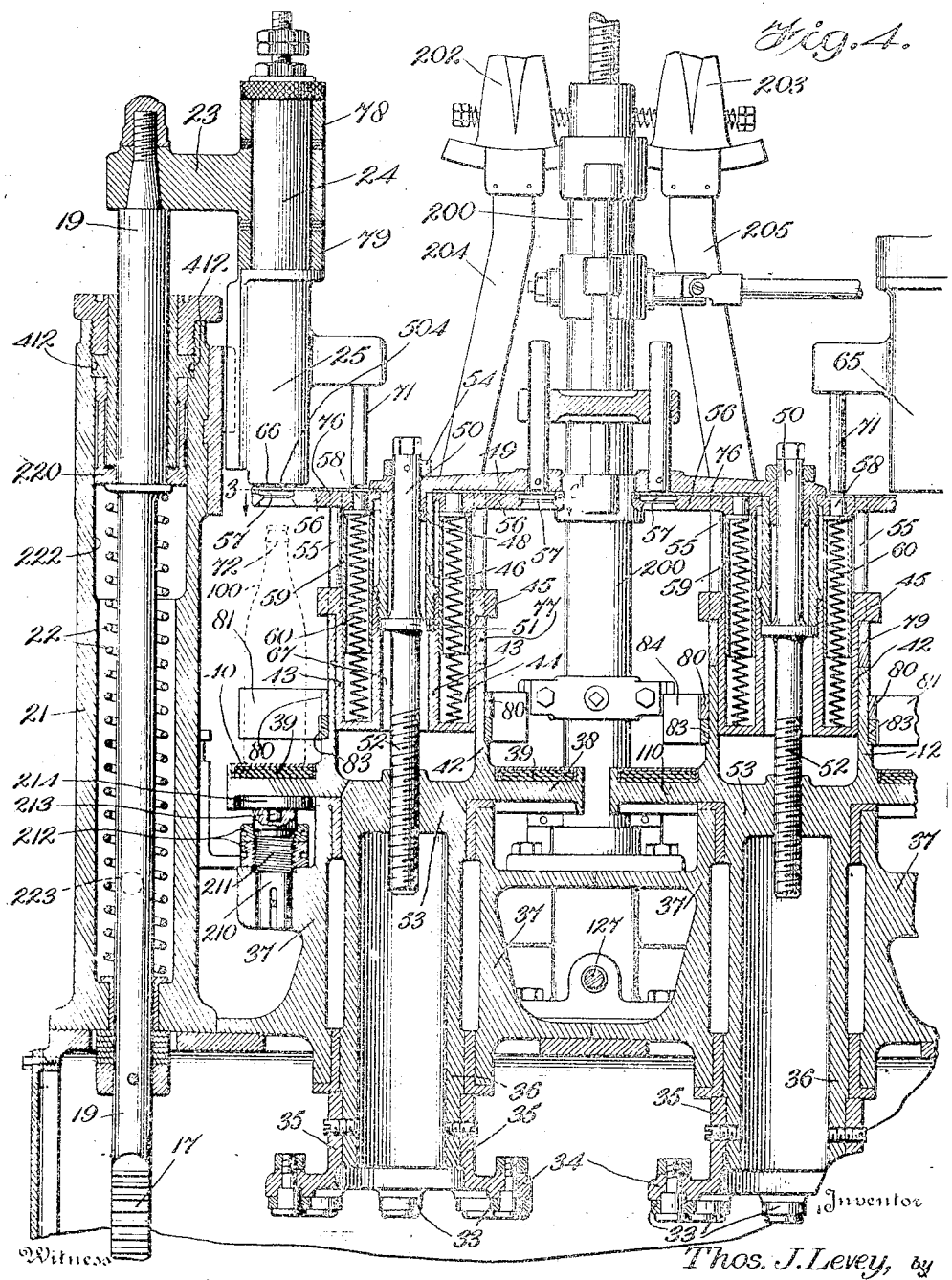

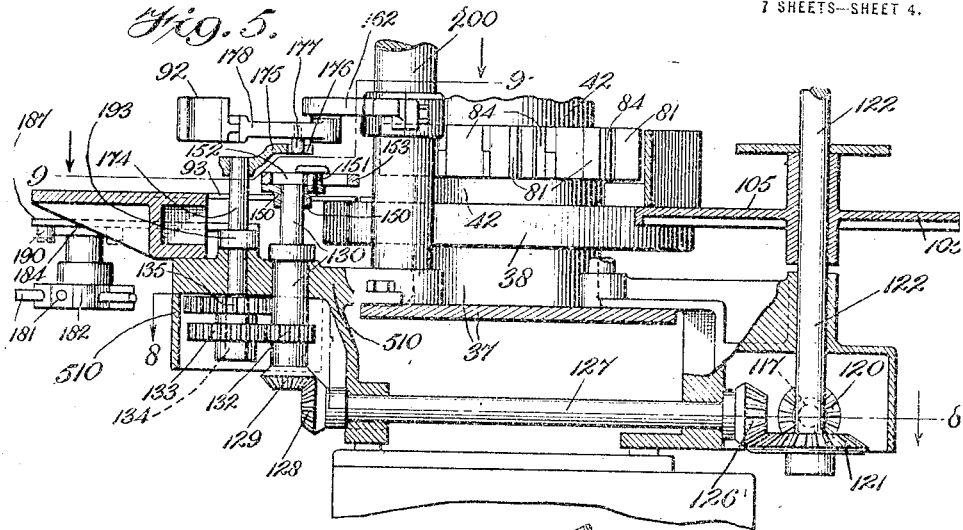

T. J. LEVEY.
BOTTLE CAPPING MACHINE.
APPLICATION FILED JAN. 30, 1917.
1,282,247.
Patented Oct. 22, 1918.
7 SHEETS—SHEET 5.
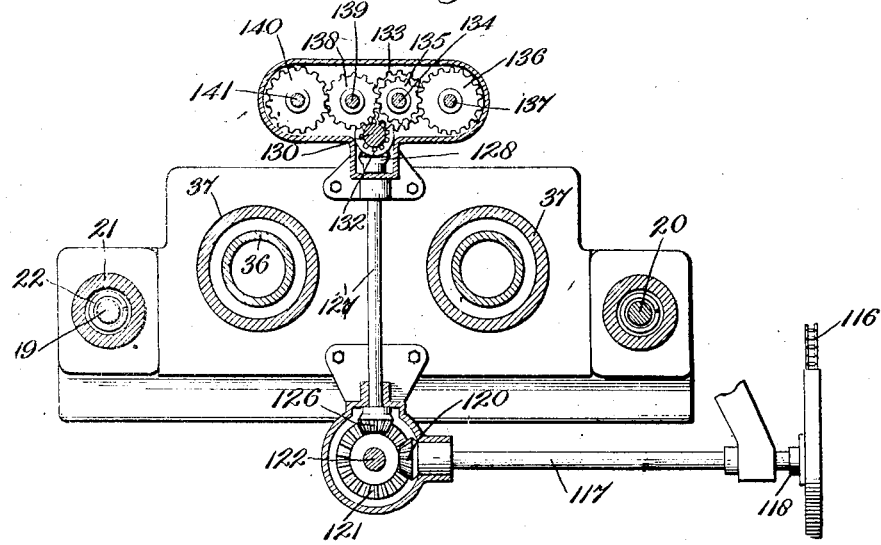
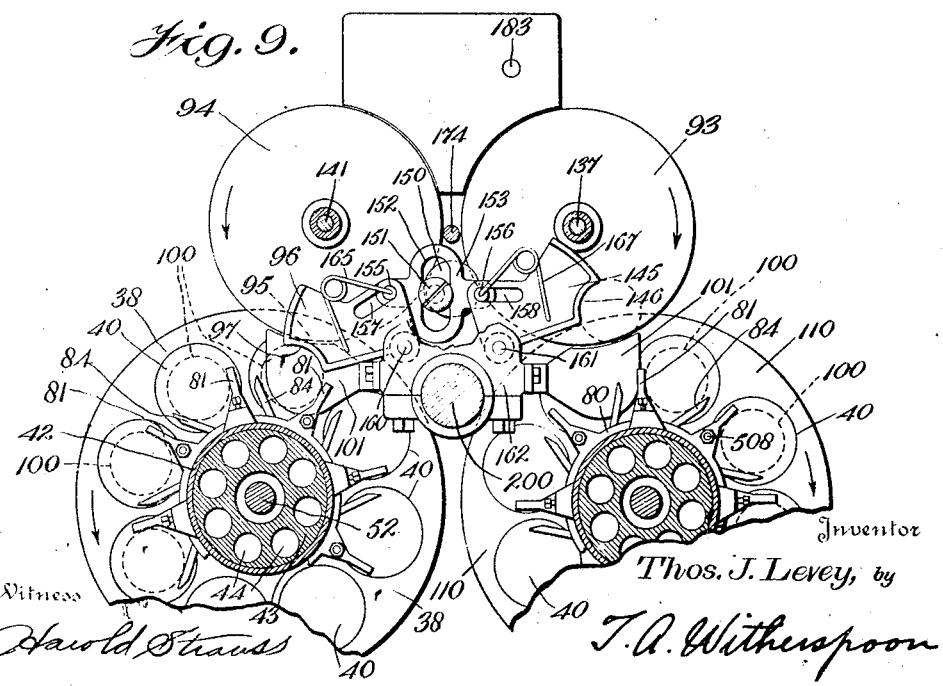
Inventor
Thos. J. Levey, by
T. A. Witherspoon
Attorney
Witness
Harold Strauss

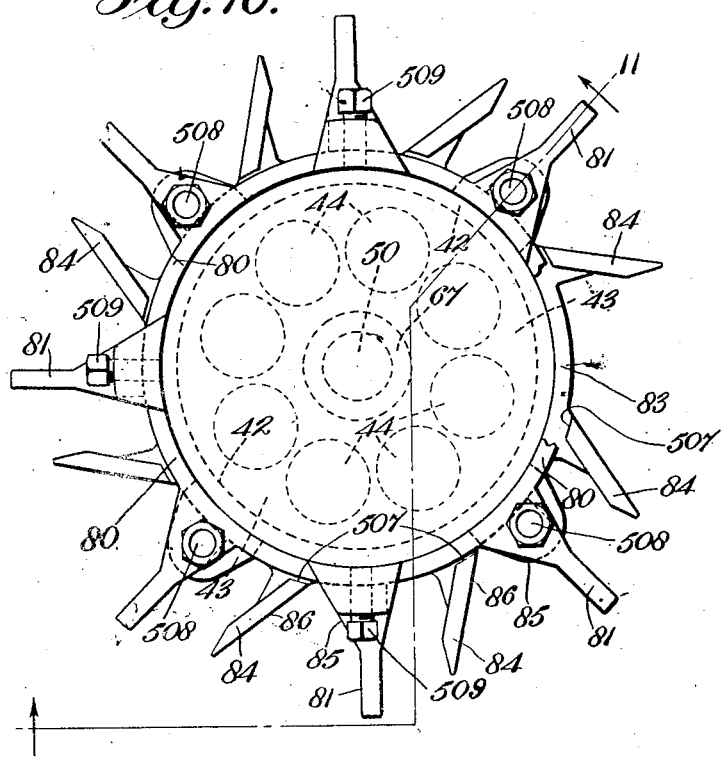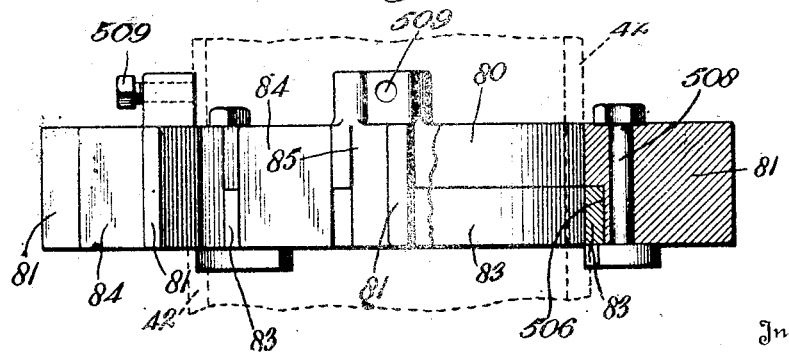

T. J. LEVEY.
BOTTLE CAPPING MACHINE.
APPLICATION FILED JAN. 30, 1917.
1,282,247.
Patented Oct. 22, 1918.
7 SHEETS—SHEET 7.
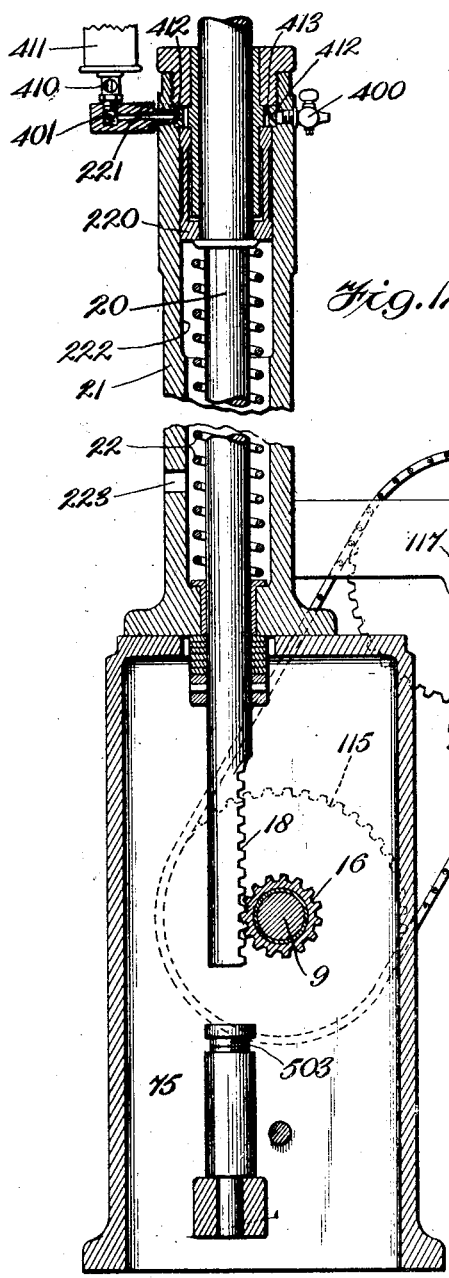
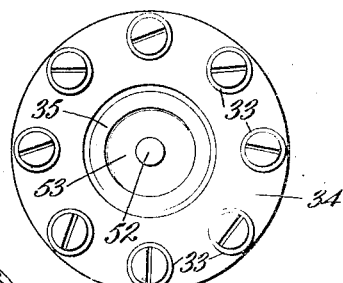
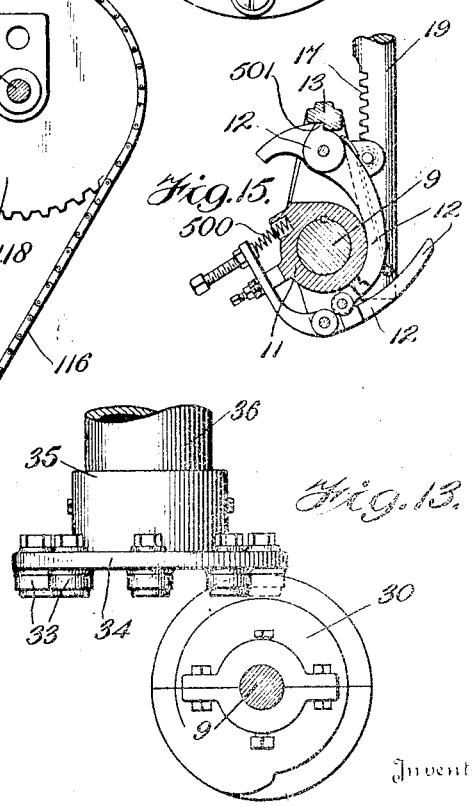
Witness
Harold Strauss
Inventor
Thos. J. Levey, by
T. A. Witherspoon
Attorney

UNITED STATES PATENT OFFICE.

THOMAS J. LEVEY, OF BALTIMORE, MARYLAND, ASSIGNOR, BY MESNE ASSIGNMENTS, TO FERDINAND GUTMANN & COMPANY, OF NEW YORK, N. Y., A CORPORATION OF NEW YORK.

BOTTLE-CAPPING MACHINE.

1,282,247.  Specification of Letters Patent.  Patented Oct. 22, 1918.

Application filed January 30, 1917.  Serial No. 145,492.

*To all whom it may concern:*

Be it known that I, THOMAS J. LEVEY, a citizen of the United States, residing at Baltimore, in the State of Maryland, have invented certain new and useful Improvements in Bottle-Capping Machines; and I do hereby declare the following to be a full, clear, and exact description of the invention, such as will enable others skilled in the art to which it appertains to make and use the same.

This invention relates to bottle capping machines and has for its object to provide a machine of this nature which will be comparatively inexpensive to manufacture, certain in action and more efficient in use than those heretofore proposed.

With these and other objects in view, the invention consists in the novel details of construction and combinations of parts more fully hereinafter described and particularly pointed out in the claims.

Referring to the accompanying drawings, forming a part of this specification, in which like numerals designate like parts in all the views:—

Fig. 4 is a sectional elevational view along the line 4—4 of Fig. 2, of a portion of the mechanism, certain parts appearing on the right hand side of said Fig. 2 being omitted;

Fig. 5 is a detail sectional view partly in elevation of a portion of the mechanism, taken on the line 5—5 of Fig. 2 looking in the direction of the arrows;

Fig. 6 is a plan view of a portion of the parts shown in Fig. 5, illustrating the operation of the bottle selecting tongue or member;

Fig. 7 is an enlarged detail plan view of a portion of the parts illustrated in Fig. 9;

Fig. 8 is a sectional view taken on the line 8—8 of Fig. 5 looking in the direction of the arrows, the view being turned through an angle of 90°;

Fig. 9 is a sectional plan view, taken on the line 9—9 of Fig. 5;

Fig. 10 is an enlarged plan view of the bottle holding fingers;

Fig. 11 is a partly sectional, partly elevational view taken on the line 11—11 of Fig. 10;

Fig. 12 is a sectional detail view taken on the line 12—12 of Fig. 1 looking in the direction of the arrows;

Fig. 13 is a detail view partly in section of the operating cam and its associated parts illustrated in Fig. 1;

Fig. 14 is a bottom plan view of the driven fingers or rollers illustrated in Fig. 13; and Fig. 15 is a sectional elevational view taken on the line 15—15 of Fig. 1, showing the construction of the intermittent clutch mechanisms.

Figure 1:
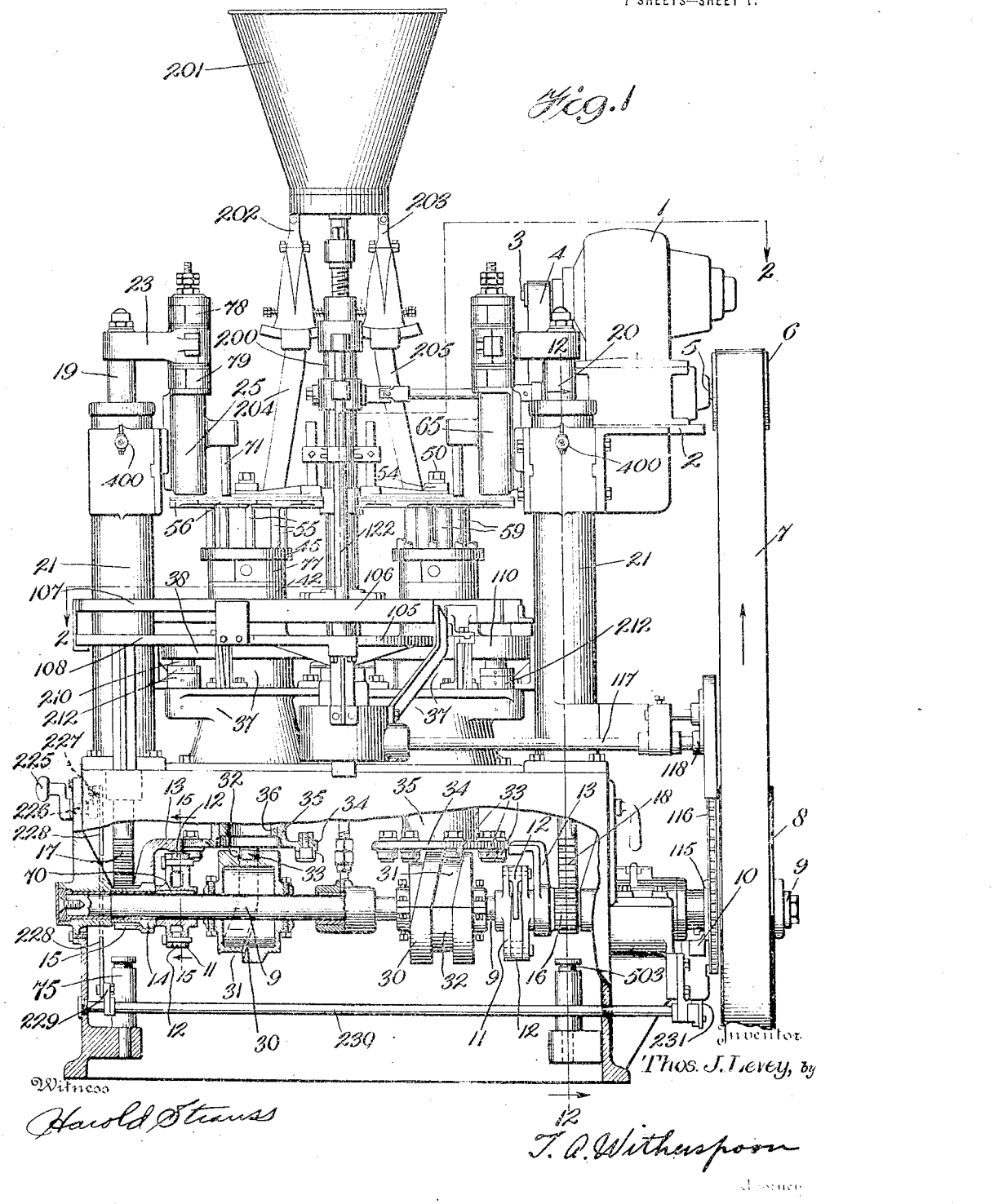
Figure 1 is an elevational view partly in section of a machine made in accordance with this invention.

1 indicates any suitable source of power, for example, an electric motor mounted on the bracket 2 and having the driving shaft 3 adapted to impart motion to the driving belt 4 which, through mechanism not illustrated, drives the power shaft 5 carrying the drive pulley 6 over which passes the power belt 7. Said power belt 7 also passes over the driving pulley 8, loosely mounted on the main drive shaft 9, provided with a clutch mechanism 10 adapted to connect and disconnect said pulley 8 with said shaft 9 when starting and stopping the machine. Rigid with said shaft 9 is the intermittent clutch member 11 provided with the tripping dogs 12 adapted to coact with the clutch lever 13, rigid with the sleeve 14, loose on the shaft 9 and carrying the driving pinion 15, all as will be clear from my prior Patent #974402, dated November 1, 1910, and entitled Power transmitting device. There are two clutches 11 and clutch levers 13 associated with corresponding driving pinions 15 and 16, as illustrated in Fig. 1, and they impart motion to a pair of vertically movable racks 17 and 18 respectively.

These said racks are respectively rigid with the reciprocating capping head operating rods 19 and 20, associated with their corresponding capping heads 25 and 65. As the said heads are duplicates of each other, only the one lettered 25 will be described in detail.

Referring more especially to Fig. 4, the capping head operating rod 19 is associated with an outer barrel 21 in which the said rod 19 reciprocates and the latter is surrounded by the compression spring 22 which is compressed when said rod is moved downwardly by the pinion 15, as seen in said Fig. 4; and said spring serves to return the parts into the position shown when said lever 13 is released in the manner to be disclosed below. Rigid with the upper portion of the rod 19 is the arm 23, which surrounds the tubular member 24, which is or may be associated with the capping head 25, the detail construction of which is substantially the same as that disclosed in my former Patent #1160084, dated November 9, 1915, and entitled Bottle capping machines.

That is to say, mounted on the interior of the capping head 25 is a mechanism similar to that illustrated is said last mentioned patent which is adapted to crimp caps around bottle necks that are suitably presented to the lower end 66 thereof, as the said rod 19 and arm 23 move up and down, all in a manner well known.

Going back to the main driving shaft 9, it is provided with a spirally grooved cam 30 having an inclined portion 31 and a dwell portion 32 as shown. Coacting with said cam 30 is a plurality of driven rollers, fingers or teeth 33 mounted on the disk or flange 34, carried by the sleeve-like member 35 rigid with the tubular member 36, so that as said roller members 33 are revolved by said cam 30, the said tubular member 36 will be rotated on its center as an axis. The said tubular member 36 is supported by and is revolved in the main frame work 37 as shown, and is rigid with the annular bottle carrying table 38 provided with the pads or cushions 39 preferably made of rubber and having the cup shaped brass protecting plates 40 as illustrated. The said rigid table member 38 is provided with the tubular extension 42 inside which fits the hollow adjustable member 43 provided with a plurality of circularly disposed bores 44, and on the outside of said bores said cylindrical member 43 is provided with the annular flange 45. Said circularly disposed bores 44 surround a central space or bore 67, and the outer wall of said bore 67 is screw threaded on to the tubular member 46 which extends up to and receives the flange 48 of the spider member 49. Passing through said spider member 49 said flange 48 and said member 46, is the pin 50 provided with the enlarged collar 51 and the screw-threaded lower portion 52 as shown. The said screw threaded lower portion 52 of the pin 50 takes into the upper portion 53 of the tubular member 36 and the upper portion of the rod 50 is suitably provided with a collar 51 to secure the parts firmly together.

Figure 3:
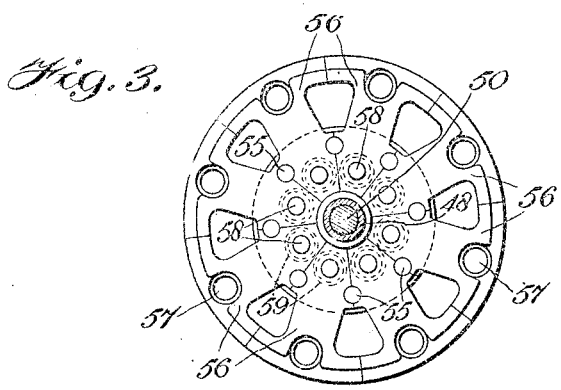
Fig. 3 is a sectional view taken on the line 3—3 of Fig. 4, illustrating in plan the depressible cap holding segments.

Passing through the annular flange 45 is a plurality of vertical guide rods 55 passing through holes in the individual segments 56 of the cap carrying mechanism, as will be clear from Figs. 3 and 4. Each of these segments 56 is provided with a depression 57 adapted to receive a bottle cap (not shown) and each segment also fits over a nipple or stud 58 carried by the tubular plunger member 59 slidably mounted in its corresponding bore 44. Located in said tubular member 59 and bore 44 is a spiral spring 60, one for each segment 56.

So far as has now been described, the operation of this improved bottle capping machine is as follows:—

Power being applied to the pulley 8, by means of the driving belt 7, the main drive shaft 9 is continuously rotated. The said shaft having keyed thereto, as at 70, the clutch member 11, see Fig. 1, said clutch member together with its pivoted dogs 12 revolve with said shaft. Said dogs 12, as best illustrated in Fig. 15, are controlled by the adjustable spring 500, and since the lever 13 takes against the lug 501, it follows that said lever cannot be released until a predetermined pressure overcomes the compression of said spring 500, all as will be clear from my said Patent #974402. Therefore, the said lever 13 and pinion 15 will continue to revolve with said shaft 9 until this said predetermined pressure has been reached. The revolving of the pinion 15 pulls down the rack 17 associated therewith, and the pulling down of said rack compresses the spring 22, see Fig. 4, while at the same time it pulls down the arm 23 and the capping head 25. Associated with the capping head 25 is a pin 71 adapted to contact with each stud member 58 as it is brought thereunder in the manner to be disclosed below.

A given stud member 58 being thus brought under the descending pin 71, the segment 56 corresponding to the stud member 58 in question is forced downwardly against the compression of its corresponding spring 60, and a bottle cap, (not shown) having been previously fed to the depression 57 of said member 56, by means to be disclosed below, the said cap is brought into proper position above the top 72 of the bottle 100, and the capping head 25 continuing to descend with the rack 17, the said cap is crimped onto the bottle head 72 in the manner substantially as described in my said former Patent #1160084.

During the capping operation, a certain amount of pressure is brought upon the capping head 25, and is transmitted to the pinion 15 and the lever 13, and the dogs 12 and spring 500 are so adjusted as to cause said dogs to automatically trip or release the lever 13 of the clutch at each capping operation, thus permitting the parts through the action of spring 22 to return to their former positions.

If for any reason, however, the bottle 100 should be abnormally long or its head 72 be abnormally large, or if for any other reason, the said predetermined pressure on the lever 13 should be reached before the capping operation is completed, the said lever will trip, whenever said pressure has been reached, and thus avoid breaking the bottle or a part of the machine.

In the meantime, the power shaft 9 in revolving turns the cam 30, and its cam groove 31 causes a rotation of the flange 34, the tubular member 35, the tubular member 36, and with said tubular member 36 the parts 53, 42, 38, 43 and 45 together with the depressible sectors 56 and pin 50, the spider 49 remaining fixed. In other words, after the capping operation has been completed, the bottle is turned angularly about 45° and a new bottle and cap is brought into position underneath the capping head 25 whereupon the cycle of operations is repeated.

It sometimes happens that no bottle is in place underneath the capping head 25, and in such event were no means provided, the pinion 15 would pull the rack 17 down beyond its normal distance with possible disastrous results to the machine. In order to provide against such a contingency as well as to insure that the lever 13 will trip with certainty, after each predetermined descent of the rack 17, I provide the cushioned stop 75, see Figs. 1 and 12, which may be made adjustable by means of the screw threads 503, and which is adapted to receive the extreme lower end of the rack 17 whenever the said rack from any cause is lowered sufficiently to contact with the said stop 75.

Above the depressible cap carrying sectors 56 there is provided the stationary metal plate 76 provided with the orifice 504 to accommodate the capping head 25, which plate serves the purpose of preventing the caps from jumping out of the depressions or apertures 57 during the descent of the capping head 25 or during the rotation of the sectors 56. During the descent of the capping sectors 56, they are guided by the rods 55 mounted in the annular flange 45, and as will be clear from Fig. 4, the said sectors 56 may descend as far as the said flange 45 should it be so desired. In other words, by adjusting the member 43 carrying the said flange 45, up and down, bottles of different heights may be readily accommodated. That is to say, the upper edge of the extension 42 accommodates an adjusting collar or sleeve 77, and the said sleeve may be readily removed and a sleeve of a wider or of a narrower dimension may be substituted, thus raising or lowering the flange 45, according to the height of the bottle being capped. In order to facilitate this adjustment of the flange 45 up and down, it is preferred to use split sleeves such as 77, see Fig. 1, and in order to facilitate the bodily movement of said flange 45 a wrench may be applied to the upper end of the rod 50 whereupon the said rod through the screw threads 52 may be loosened up sufficiently to accommodate any predetermined size of collar 77, and then it may be screwed down so as to hold said collar firmly in place. In other words, it is a comparatively easy matter to interchange the collars 77 and to thus accommodate bottles of different dimensions without any material stoppage of the capping operation.

Of course, whenever the length of the bottle 100 is changed the beginning and end of the stroke of the bottle capping head must be likewise changed. In order to accomplish this purpose collars which may be split collars such as 78 and 79 see Fig. 1, are located on each side of the arm 23 and by properly choosing the dimensions of the said collars 78 and 79, the beginning and the end of the stroke of the capping head 25 may be located in any desirable positions.

Surrounding the rigid extension 42 of the tubular member 35 is a ring or collar like member 80, see Figs. 2, 4, 9, 10 and 11, provided with bottle holding fingers 81 and below said ring member 80 is a similar ring member 83 provided with bottle holding fingers 84. The said fingers 81 are provided with the inclined portions 85 and the said fingers 84 are provided with a surface 86 which makes an angle with said portion or surface 85, as will be clear from Fig. 10.

The said rings 80 and 83 are circumferentially adjustable relatively to each other, in order that bottles of different diameters may be accurately centered under the capping head 25. This adjustment is conveniently provided by cutting away the fingers 81 of the ring 80 as indicated at 506, see Fig. 11, and by cutting away the fingers 84 of the ring 83 as indicated at 507, Fig. 10. The two rings are firmly held together by means of the bolts 508 and the upper ring 80 is secured to the extension 42 as by the set screws 509.

By mechanism to be disclosed below, the bottles are forced radially in between the surfaces 85 and 86 and are thus accurately centered as they are brought around by the revolving table 38 under the bottle capping head 25. The manner in which the bottles are brought to the table 38 will be clear from the following:—

Figure 2:
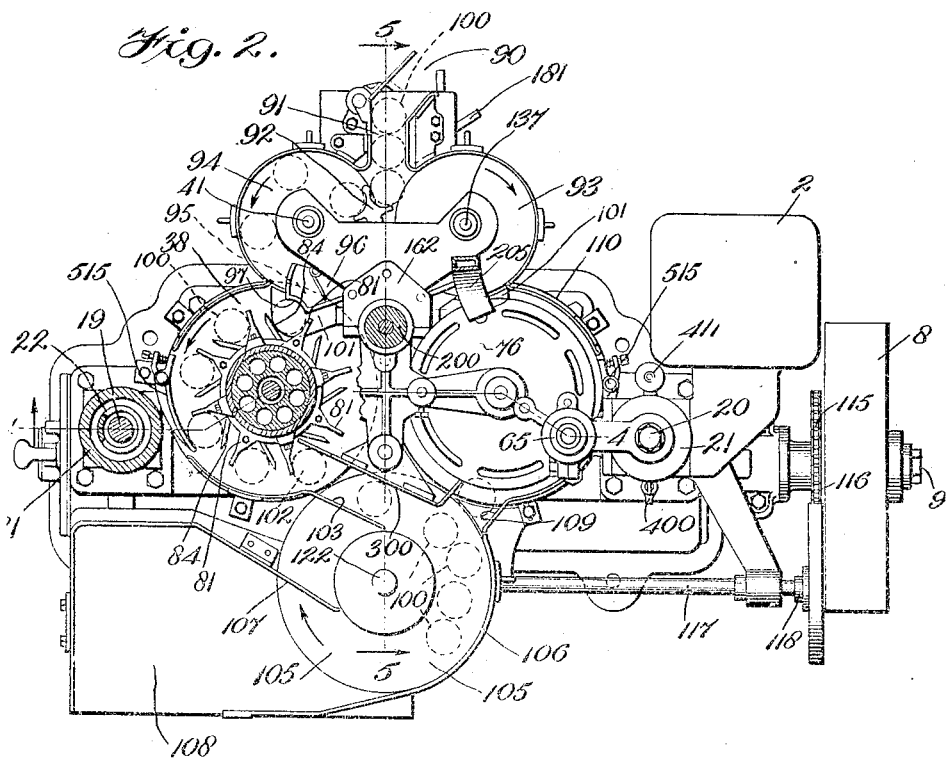
Fig. 2 is a sectional plan view of the machine taken on the line 2—2 of Fig. 1, certain of the parts being omitted.

Referring especially to Figs. 2 and 9, the bottles 100 are fed from a suitable rack, filling machine, or other mechanism, (not shown,) into the passage 90 whereupon they are bodily pushed along the passage 91 until they reach the oscillating tongue or distributing member 92 which as it oscillates to the right and left, as seen in Figs. 2 and 6, by mechanism to be disclosed below, causes the bottles to be forced onto the revolving table 93 or the revolving table 94 as the case may be. Supposing that the said bottles are forced or guided by the said tongue 92 on to the table 94, they are carried by said table in a counter-clockwise direction, as seen in Fig. 2, to the point 95, which is directly opposite to the oscillating feed member 96, having the curved portion 97 adapted to contact with the said bottles. The said oscillating surface 97 forces the bottles from the revolving table 94 onto the stationary support 101. While the bottle 100 is thus supported on the said stationary plate 101, the finger 81 having the inclined surface 85 contacts with said bottle and forces it in a counter-clockwise direction, as seen in Fig. 2, onto the revolving disk or support 38 which serves to move the bottle through an angle of substantially 135° and into accurate alinement with the reciprocating bottle capping head 25. The bottle having been capped in the manner above disclosed is next carried through an angle of about 90° to the position 102, see Fig. 2, whereupon it contacts with the guide plate or member 300 which causes it to enter the guide way 103. The capped bottle is forced along said guide way by the said finger 81 until it reaches the revolving table 105 which carries the said bottle around through an angle of about 270° whereupon the said bottle strikes against the stationary inclined guide member 107 with which said revolving table 105 is associated, and said member 107 causes the bottle to pass on to the stationary support or table 108, as will be clear from Fig. 2. In order to make sure that the bottles do not leave the table 105, a stationary circular guide surface 106 is also provided, as illustrated. From the stationary support 108 the bottles may be taken off by hand and suitably stored in cases for shipment.

As will be clear from Fig. 2, there is provided on the right hand side of the machine a table 93 which is in all respects a duplicate of the table 94, and likewise there is provided a table 110 which is a duplicate of the table 38, as well as guiding fingers 84 and 81. Further, there is provided a duplicate passage 109 to admit the bottles from the duplicate table 110 to the revolving table 105.

The mechanism by which the said tables 93, 94, and 105 and their associated parts are operated, will now be described. Referring more especially to Figs. 12 and 1, shaft 9 is provided with a sprocket wheel 115, over which passes a sprocket chain 116 and the shaft 117 is further provided with a sprocket wheel 118 over which likewise passes said chain 116, so that power from the main driving shaft 9 is readily transmitted to the said shaft 117. The said shaft 117, as best shown in Figs. 5 and 8, is provided with a bevel gear 120 meshing with the bevel gear 121 mounted on the shaft 122, carrying the table 105. Also meshing with the bevel gear 121 is the bevel pinion 126 carried by the cross shaft 127, which is provided with the bevel gear 128 meshing with the bevel gear 129, carried by the stub shaft 130. As best shown in Figs. 5 and 8, the said shaft 130 is provided with the spur gear 132 meshing with the gear 133 mounted on the shaft 134 carrying the gear 135 which meshes with the gear 136 mounted on the shaft 137 carrying the table 93, as seen in Figs. 2 and 9. The gear 135, as best shown in Fig. 8, also meshes with the gear 138 mounted on the shaft 139, and said gear 138 meshes with the gear 140 mounted on the shaft 141 carrying the table 94. It will now be clear that as power is transmitted from the driving pulley 8 and main power shaft 9 through the sprocket chain 116 and shaft 117, and through the parts just mentioned, the tables 93, 94 and 105 will be rotated in the directions indicated by the arrows.

Coming to the means for operating the bottle feeding members 96 and 145 provided with the bottle feeding surfaces 97 and 146 respectively, and referring especially to Figs. 5, 7 and 9, it will be seen that the shaft 130 is provided with a collar 150 carrying a pin 151 moving in the slot 152 with which the link member 153 is provided. It therefore follows that as the said shaft 130 revolves, the said pin 151 will reciprocate in said slot 152, and the said pin being mounted eccentrically as shown, will cause the said member 153 to reciprocate to the right and left, as seen in Fig. 9. Said link member 153 is provided with the pins 155 and 156 respectively while the pin 155 reciprocates in the slot 157 with which the bottle feeding member 96 is provided. In like manner the pin 156 reciprocates in the slot 158 with which the bottle feeding member 145 is provided. The said bottle feeding members 96 and 145 are respectively pivoted as at 160 and 161 to the frame 162 of the machine. In order that the oscillating movements of the feed members 145 and 96 shall be cushioned and thereby not break the bottles, should they become jammed, I provide the spring members 165 and 167 respectively secured to the pins 155 and 156 at one end, and at their other ends to the respective bottle feeding members 145 and 96 as shown. It thus follows that as the said shaft 130 revolves, the said bottle feeding members 96 and 145 are oscillated backward and forward through the yielding connections 165 and 167 respectively.

Coming now to the mechanism serving to oscillate the distributing tongue 92 and referring more especially to Figs. 2, 5 and 6, a vertical stub shaft 174 is mounted in the gear casing 510, see Fig. 5, and the said shaft 174 carries at its upper end the lever 175 provided with the slot 176 in which fits the pin 177 carried by the finger 178 of the separating tongue 92. The oscillating motion of the shaft 174 and lever 175 is derived as follows:—It is well known that in operating capping machines of this nature, the bottles are fed to the machine from revolving racks associated with the bottle filling mechanism and in this case the motion of said revolving rack is utilized to operate the said tongue 92 as will now be set forth.

That is to say, referring more especially to Fig. 6, in which 180 diagrammatically indicates a moving portion of the bottle holding rack of a filling machine, there is located in the path of motion of said member 180 the plurality of projecting rods or fingers 181, preferably six in number, which are rigid with the star wheel 182 revolving on the pin 183 as a center. Also rigid with the said star wheel 182 is the cam member 184 provided with the flat surfaces 185 and the cutaway surfaces 186. The flat link member 187 is provided with the slot 188 through which said pin 183 projects and said link member 187 is also provided with the roller members 189 and 190 respectively. Said roller member 189 normally fits against one of the flat sides 185 of the cam member 184 while the said roller member 190 normally fits against one of the cutaway surfaces 186 of the said cam member. It thus results as the said projecting fingers 181 are turned in a counter-clockwise direction, as seen in Fig. 6, said cam member 184 will be likewise turned, and one of the flat surfaces 185 will force the said connecting link member 187 from its full line position into its dotted line position.

As the said cam member 184 continues to revolve the said link member 187 will be moved from its dotted line position, shown in Fig. 6, back to its full line position. In other words, a continuous revolution of the cam member 184 will reciprocate the said link member 187. The said link member 187 is connected, as by the pin or pivot 192, to the arm 193 provided with the slot 194 in which said pin 192 operates. The said arm 193 is rigid with the shaft 174, as will be clear from Figs. 5 and 6, and therefore, as the said link member 187 is oscillated the said arm 193 causes the said shaft 174 and the said lever 175 to likewise oscillate. The oscillation of said lever 175 by means of the pin 177 causes the corresponding oscillation of the bottle distributing tongue 92; which latter oscillation causes the bottles to be alternately fed to the tables 93 and 94 respectively.

Rising approximately on the center line of the machine, as seen in Figs. 1, 2, 4 and 9, is a supporting post 200 and the bottle feeding tables and bottle capping mechanisms above mentioned are located symmetrically on both sides of said center line so that the bottle capping operations performed by the bottle capping heads 25 and 65 may alternate with each other and thus the capacity of the machine is substantially doubled.

The caps for the bottles are conveniently carried in the hopper 201 and they are fed from said hopper by the oscillating cap feeders 202 and 203 to the chutes 204 and 205 respectively. The said hopper and chutes are of any suitable or desired construction, such for example as that shown in my said Patent #1160084, and the parts are so arranged that bottle caps are presented to the various sectors 56 always with their cork side downward. The said chutes 204 and 205 deliver to the said sectors 56 at points about 135° from their respective bottle capping heads 25 and 65, as may be gathered from Fig. 1 and also from Fig. 2, wherein a portion of the chute 205 is illustrated above the stationary plate 76, but the particular point at which these chutes deliver their caps is a matter of small importance. As the caps are delivered to their respective sectors, the intermittent rotation of the sectors in the manner above disclosed brings the said caps underneath the bottle capping heads. It should be observed that the said cap holding sectors 56 derive their motion from the inclined portion 31 of the grooves of the cams 30 as do the bottle holding tables 38 and 110, and that the dwell portions 32 of the said cam grooves hold the said sectors and tables firmly in correct alinement with their respective capping heads during the capping operation. During the capping operation considerable strain is brought upon the tables such as 38 and 110 and in order to take care of this strain, I preferably provide in the casting 37, directly beneath the capping heads, an adjustable member 210 provided with the screw threads 211 over which screw the adjustable nuts 212. The upper end of said member 210 is bored as shown to receive the projection 213 of a table supporting disk 214 which fits up against the under side of the table 38, for example, and thus firmly supports the said table 38 when the capping head 25 is crimping the cap onto the head 72 of the bottle 100. Inside each of the tubular members 21 is located a spring 22 as above mentioned and in order to cushion like parts I provide on each of the reciprocating rods 19 and 20 a piston like member 220, see Figs. 4 and 12. The said tubular members 21 are likewise bored out as at 222 to accommodate the reciprocations of said pistons 220. Accordingly, as the said pistons 220 descend they readily expel the air inside the tubular members through the openings 223. As said pistons 220 descend more or less air passes through the passages 221 and the cocks 400, and when said pistons 220 descend this said air becomes more or less trapped on the inside of said pistons owing to the automatic closure of the check valves 401. Accordingly, said trapped air slowly escapes through the partly closed cocks 400 as said pistons ascend, and thus the motion of the rods 19 and 20 is cushioned on their ascent by said trapped air. 410 represents an opening for admitting air past the valve 401, and 411 indicates an oil cup for feeding oil with the air entering through the orifice 410. 412 represents a circumferential channel for the oil and air, and 413 connections between said channel and the space above the piston 220.

In order that the bottles 100 may be firmly pressed against the fingers 81 and 84 of the rings 80, and 83, and thus accurately centered beneath the capping heads 25 and 65 at the moment of capping, there is provided for each of the tables 38 and 110 a pivoted, spring controlled gate 515, see Fig. 2. The said gates 515 are adapted to yieldingly engage the said bottles as they are brought beneath a capping head such as 25, for example, and to firmly press the same against the inclined surfaces 85 and 86 of the fingers 81 and 84, as will be clear from said figure. It thus results that the bottles are always firmly held in the correct positions when the capping heads descend.

Any suitable mechanism may be provided for controlling the clutch mechanism 10, but I have shown a crank 225 mounted on a stub shaft 226, carrying a crank arm 227, connected by a link 228 to a similar crank arm 229 carried by a rod or shaft 230, which is connected by a suitable link 231 to the clutch 10, all as will be clear from Fig. 1. It is therefore possible to start and stop the entire machine by merely moving the crank handle 225 from one position to another, the said movement serving to engage or disengage the pulley 8 from the main power shaft 9, as above disclosed.

The operation of this bottle capping machine will be clear from the foregoing but may be briefly summarized as follows:—

Supposing the parts to be in the positions illustrated, in Figs. 1, 2 and 4, upon starting the motor 1, power will be transmitted from its shaft 3 through the belt or chain 4 to the shaft 5, to the pulley 6, and by the belt 7 passing around said pulley 6, to the pulley 8. Now supposing the members of the clutch 10 to be engaged by moving the control crank or handle 225 to its starting position, power will further be transmitted from the said pulley 8 through the said clutch 10 to the main or cam shaft 9.

The rotation of the shaft 9 will cause the cams 30 as well as the intermittent grip devices 11 to revolve, and the said cams 30 will, through the successive engagement of the rollers 33 with the cam grooves 31, cause the rotation of the table-carrying standards 36. In this connection it will be noted that the grooves 31 of the said cams 30 are pitched in opposite directions, as indicated by the dotted and full lines in Fig. 1, and therefore, they impart rotation in opposite directions to the standards 36 carrying the tables 38 and 110.

Power will also be transmitted from the shaft 9 through the sprocket 115, sprocket chain 116, sprocket 118 to the shaft 117, and through the bevel gears 120 and 121, see lugs, 1, 2, 5, 8 and 12, to the shaft 122 carrying the discharge bottle table 105 and thereby impart rotation to the said table. Power will further be transmitted from the said gear 121 to the bevel gear 126, shaft 127, and the bevel gears 128 and 129 to the shaft 130 carrying the eccentric disk 150 which through the link member 153 actuates the bottle feeding members 96 and 145 as above disclosed, see Fig. 9. Power will likewise be transmitted from the said shaft 130 through the spur gear 132 to the gear 133, mounted upon the stub shaft 134. Said stub shaft, as is indicated in dotted lines, Fig. 5, and in full lines, Fig. 8, carries the gears 133 and 135 and the latter transmits the said power to the gears 136 and 138 respectively. The said gear 136 being mounted upon the shaft 137 carrying the bottle feeding table 93, will impart rotation to the same in a clockwise direction, as seen in Figs. 2 and 9. The gear 138 will transmit its motion to the gear 140 mounted upon the shaft 141 carrying the bottle feeding table 94 and will cause the rotation of the latter in a counter clockwise direction as seen in said Figs. 2 and 9.

Referring more especially to Fig. 2, supposing bottles 100 to be fed either by hand or from a suitable filling machine, (not shown), into the passage 90 and to be forced along the passage 91, they will be brought into position to be acted upon by the bottle separating or distributing tongue 92 which, as was above disclosed, is actuated from said filling machine through the star wheel 182, cam 184, link 187, lever 192, lever 175 and pin 177, see Figs. 5 and 6. The oscillating movements of said distributing tongue 92 will force the bottles alternately upon the bottle feeding tables 93 and 94 from whence they will be carried, as indicated by the arrows, to the bottle feeding gates or members 96 and 145 respectively.

As will be clear from Figs. 1, 4 and 13, when a roller such as 33 is engaged in the inclined portion 31 of the cam groove, rotation of the said cam will impart rotation to the standard 36 and to its corresponding bottle carrying table such as 38. However, when the said roller 33 reaches the straight or dwell portion of the groove, rotation of the bottle carrying table such as 38 will be temporarily suspended. The parts are so timed that during this stoppage of said table such as 38, the bottles are fed from the continuously revolving feeding table such as 94 onto the stationary plate 101 and it is also at this same stationary period that the capping of the bottle takes place.

As illustrated in the drawings, Figs. 2 and 4, the table 38 is in this said position and the bottle feeding member 96 is represented as having just fed a bottle 100 from the table 94 in between the fingers 81 and 84 of the rings 80 and 83. Similarly the bottle under the capping head 25 is illustrated as about to be capped.

The said capping action is accomplished through the engagement of the toe 501 carried by the dog 12 of the intermittent clutch 11 with the member 13 of the said clutch, see Fig. 15. That is to say, such engagement will cause the member 13 to revolve the pinion 15 and the said pinion will pull down the rack 17 carried by the rod 19 and the said rod through the connection 23 will cause the capping head 25 to descend. Upon such descent the pin 71 will contact with a stud 58 of a sector 56 and cause the same to be forced downwardly against the compression of the spring 60. In this connection it might be stated that the pin 71 is of such a length that it contacts with the said stud 58 before the end 66 of the capping head 25 touches the sector 56, thereby always leaving a small space between the said capping head and the said sector. Upon the descent of the said capping head 25, a bottle cap (not shown) held in the space 57 will be crimped upon the neck 72 of the bottle in the manner disclosed in my prior Patent #1160084. As soon as the pressure upon the said bottle reaches a predetermined point it will be transmitted through the rod 19 to the clutch 11, and will overcome the compression of the spring 500 thereby causing the dog 12 to disengage the member 13 of the said clutch, whereupon the spring 22 will return the capping head and its associated parts to their initial position or to that illustrated in the drawings. The roller 33 will now again engage an inclined portion of the cam groove whereupon the rotation of the table 38 will again take place, the capped bottle will be moved from under the capping head and a fresh one brought into place while the bottle feeding member 96 will move back to engage a new bottle.

It is an important feature of the invention that the feeding members 96 and 145 are yielding or spring controlled during their feeding operation, for should the bottles become jammed the feeding of the same onto the stationary plates 101 is automatically suspended until the intermittent rotation of the tables 38 and 110 clears the passage. Again, since the tables 94 and 93 are continuously rotated it is an important feature that they feed bottles onto stationary plates such as 101 rather than onto the intermittently moving tables such as 38 and 110 for owing to the liability of the motion of the feeding members 96 and 145 not synchronizing with the intermittent stoppage of the tables 38 and 110, due to the jamming of the bottles above mentioned, if the said stationary plates were not provided bottles could be fed onto said tables 38 and 110 before the fingers 81 and 84 were in position to receive them, and therefore, said bottles would be liable to further jamming and breakage. By providing said stationary plates 101, on the other hand, the bottles come to a full stop in the passage from the tables 93 and 94, and are gently moved by the spring pressed feeding members 96 and 145 into their position between the fingers 81 and 84, whereupon said fingers move said bottles from their positions of rest off said plates onto said tables 38 and 110 which are traveling at the same rate as said fingers, so that there is no tending whatever to upset the bottles.

As the table 38 revolves intermittently the bottles eventually reach the position 102, Fig. 2, when they are brought into contact with the guide member 300 and are thereby forced from the table 39 on to the continuously revolving discharge table 105. As they are rotated by said table 105 they are brought into contact with the guide member 107 and thereby guided from the said revolving table 105 on to the stationary table 108 from whence they are removed by hand to suitable cases for shipping.

The operation of the tables 93 and 110 and their associated parts, see Figs. 2 and 9, is substantially the same as that disclosed in connection with the tables 94 and 38 except that the said operation takes place approximately 180 degrees behind that of the said tables 94 and 38.

As was above explained, when it is desired to change the size of the bottles being capped, it is only necessary to adjust the positions of the various parts by substituting wider or narrower collars 77, 78 and 79, as may be necessary. The change in the diameter of the bottles is then taken care of by adjusting the rings 80 and 83, whereupon bottles of an altogether different size may be accurately fed, centered and capped.

A further important feature of the invention resides in the fact that should one of the bottle capping heads or its associated parts break down from any cause, it is a comparatively simple matter to disengage that side of the machine from the other side, and to continue capping bottles from said other side, without having to stop the entire operation of the filling machine or of the device feeding bottles to the capping machine. This disengagement of the parts is readily accomplished by unscrewing the bolts holding a plurality of the cam operated rollers, see Fig. 1, and also by removing one or more of the fingers such as 181, see Fig. 6, by which the tongue 92 is operated. When such changes are made the particular bottle capping table such as 38 or 110 affected will become stationary, for no longer will any power be imparted to it, and the particular portion such as 180 see Fig. 6, of the filling machine which actuates the reciprocating tongue 92 will no longer have anything to work against, and therefore, the said tongue 92 will no longer feed bottles alternately to the rotating tables 94 and 93. On the other hand, all of said bottles can be readily directed to the proper table 93 or 94 which is still in operation by merely shifting the tongue 92 over to the particular table 93 or 94 which is put out of action.

A further important advantage of the machine resides in the fact that an electric motor 1 is provided to furnish the power. This motor is of a type which admits of a ready control of the speed and therefore, by merely shifting its control lever or switch the speed of the motor, and therefore the speed of the belt and cam shaft 9 is readily increased or decreased and thus the speed of the capping heads 25 and 65 is readily accommodated to the speed of the particular filling machine which supplies the bottles to be capped.

It is obvious that those skilled in the art may vary the details of the construction as well as the arrangement of parts without departing from the spirit of the invention and therefore, I do not wish to be limited to the above disclosure except as may be required by the claims.

What I claim is:—

1. In a bottle capping machine the combination of a power shaft; a cam on said shaft; a rotatable bottle supporting table; a plurality of depressible bottle cap carrying members rotating with said table; rigid connections between said cam and table for rotating the latter; a bottle capping head adapted to reciprocate across the path of movement of said members and to depress them one at a time; and connections between said shaft and said bottle capping head for reciprocating the latter, substantially as described.

2. In a bottle capping machine the combination of a power shaft; a cam on said shaft; a plurality of depressible bottle cap carrying members mounted for rotation; rigid connections comprising a plurality of rotatable cam engaging projections and a rotatable bottle supporting means between said cam and said members for rotating the latter; a bottle capping head adapted to reciprocate across the path of movement of said members and to depress them one at a time; and connections between said shaft and said bottle capping head for reciprocating the latter, substantially as described.

3. In a bottle capping machine the combination of a power shaft; a cam provided with inclined and dwell portions rigid with said shaft; a plurality of projections engaging and adapted to be rotated around a fixed axis by said cam; a rotatable bottle support rigid with said projections; a plurality of bottle cap holding members rotatable with said support; and slidable connections between said members and support whereby said inclined portion of said cam rotates said cap carrying members to predetermined positions and said dwell portion of said cam holds them for predetermined periods in said position, substantially as described.

4. In a bottle capping machine the combination of a power shaft; a cam provided with inclined and dwell portions rigid with said shaft; a plurality of projections engaging and adapted to be rotated around a fixed axis by said cam; a rotatable bottle support rigid with said projections; a plurality of bottle cap holding members rotatable with said support; slidable connections between said members and support whereby said inclined portion of said cam rotates said cap carrying members to predetermined positions, and said dwell portion of said cam holds them for predetermined periods in said positions; a bottle capping head mounted to reciprocate across the path of movement of said cap carrying members and to depress the latter one at a time when held by said dwell portion of said cam; and yielding connection between said shaft and head for reciprocating the latter, substantially as described.

5. In a means for holding bottle caps the combination of a member adapted to support said caps; means adapted to slidably support said member; adjustable means adapted to limit the sliding movement of said member; means adapted to maintain said member in a normal position; and means adapted to prevent lateral movement of said member when the latter is moved to or from said normal position, substantially as described.

6. In a means for holding bottle caps, the combination of a supporting member; a member provided with a bore, adjustably mounted in said supporting member; a plunger-like member mounted in said bore; a cap supporting means associated with said plunger-like member; means adapted to maintain said cap supporting member in a normal position; and means adapted to adjust said bored member relatively to said supporting member, whereby the normal position of said supporting member may be varied at will, substantially as described.

7. In a means for holding bottle caps the combination of a rotatable hollow supporting means; a member provided with a plurality of bores slidably mounted in said hollow supporting means; a hollow plunger member mounted in each of said bores; a cap supporting sector carried by each of said plunger members; resilient means mounted within each of said bores and its corresponding plunger member, adapted to maintain said sectors in a normal position; a plurality of guide members associated with said sectors adapted to prevent their lateral movement; and means adapted to adjust said bored member relatively to said supporting means, whereby the normal position of said cap supporting sectors may be varied at will, substantially as described.

8. In a bottle capping machine the combination of a depressible cap supporting member; a stationary plate having an orifice overlying said member; a reciprocating capping head provided with a surface adapted to pass through said orifice; and means associated with said head provided with a surface adapted to contact with said supporting member and to depress the same slightly in advance of said head surface, substantially as described.

9. In a bottle capping machine the combination of a power shaft; a cam rigid with said shaft; a plurality of rollers adapted to contact with said cam; a rotatable sleeve carrying said rollers; a bottle supporting table rigid with said sleeve; vertically slidable cap carrying sectors rotating with said sleeve; a capping head adapted to depress said sectors one at a time; and a yielding connection between said shaft and head, substantially as described.

10. In a bottle capping machine the combination of a power shaft; a cam rigid with said shaft; a plurality of rollers adapted to contact with said cam; a rotatable sleeve carrying said rollers; a bottle supporting table rigid with said sleeve; vertically slidable cap carrying sectors rotating with said sleeve; adjustable means carried by said sleeve for supporting said sectors; a capping head adapted to depress said sectors one at a time; and a yielding connection between said shaft and head, substantially as described.

11. In a bottle capping machine the combination of means to hold caps in position to be applied to bottles of a given length; means to lower said cap holding means to a height corresponding to bottles of a lesser length; a bottle capping head adapted to apply said caps to said bottles; and means to adjust the stroke of said head to correspond with different lengths of bottles, substantially as described.

In testimony whereof I affix my signature.

THOMAS J. LEVEY.